(12) United States Patent
Harale et al.

(10) Patent No.: US 12,539,488 B2
(45) Date of Patent: Feb. 3, 2026

(54) HYDROGEN SEPARATION

(71) Applicant: Saudi Arabian Oil Company, Dhahran (SA)

(72) Inventors: Aadesh Harale, Dhahran (SA); Aqil Jamal, Dhahran (SA); Stephen N. Paglieri, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 335 days.

(21) Appl. No.: 18/331,483

(22) Filed: Jun. 8, 2023

(65) Prior Publication Data
US 2024/0408539 A1    Dec. 12, 2024

(51) Int. Cl.
*B01D 53/22*    (2006.01)
*B01D 67/00*    (2006.01)
(Continued)

(52) U.S. Cl.
CPC ....... *B01D 53/228* (2013.01); *B01D 67/0039* (2013.01); *B01D 69/02* (2013.01); *B01D 69/04* (2013.01); *B01D 69/1216* (2022.08); *B01D 69/145* (2013.01); *B01D 71/0211* (2022.08); *B01D 71/02231* (2022.08);
(Continued)

(58) Field of Classification Search
CPC .............. B01D 53/228; B01D 71/0211; B01D 71/02231; B01D 69/1216; B01D 69/145; B01D 69/02; B01D 69/04; B01D 67/0039; B01D 2053/221; B01D 2257/108; B01D 2325/04; B01D 2325/30; C01B 3/505
See application file for complete search history.

(56) References Cited

U.S. PATENT DOCUMENTS

| | | | |
|---|---|---|---|
| 5,782,960 | A | 7/1998 | Ogawa et al. |
| 5,904,754 | A | 5/1999 | Juda et al. |

(Continued)

FOREIGN PATENT DOCUMENTS

| | | |
|---|---|---|
| CN | 103372413 | 10/2013 |
| CN | 105597642 | 5/2016 |

(Continued)

OTHER PUBLICATIONS

Machine translation of CN 112957912 (Year: 2022).*

(Continued)

*Primary Examiner* — Robert Clemente
(74) *Attorney, Agent, or Firm* — Fish & Richardson P.C.

(57) ABSTRACT

An apparatus includes a porous substrate and a multi-layer membrane. The porous substrate has a pore structure configured to allow diffusion of hydrogen molecules through the porous substrate. The multi-layer membrane is configured to, in response to contacting a hydrogen molecule present in the gas stream, split the hydrogen molecule into at least one of hydrogen atoms or protons. The multi-layer membrane is configured to allow passage of the hydrogen atoms or protons through the multi-layer membrane while blocking passage of compounds that may be present in the gas stream that are larger than hydrogen molecules. The hydrogen atoms or protons, after passing through the multi-layer membrane, combine to reform the hydrogen molecule. The multi-layer membrane includes a first metallic layer, an intermediate layer, and a second metallic layer.

17 Claims, 7 Drawing Sheets

(51) Int. Cl.
  *B01D 69/02*  (2006.01)
  *B01D 69/04*  (2006.01)
  *B01D 69/12*  (2006.01)
  *B01D 69/14*  (2006.01)
  *B01D 71/02*  (2006.01)
  *C01B 3/50*   (2006.01)

(52) U.S. Cl.
  CPC ........ *C01B 3/505* (2013.01); *B01D 2053/221* (2013.01); *B01D 2257/108* (2013.01); *B01D 2325/04* (2013.01); *B01D 2325/30* (2013.01)

(56) References Cited

U.S. PATENT DOCUMENTS

| | | |
|---|---|---|
| 6,238,465 B1 | 5/2001 | Juda et al. |
| 8,262,755 B2 | 9/2012 | Repasky et al. |
| 8,287,762 B2 | 10/2012 | Repasky et al. |
| 8,778,058 B2 | 7/2014 | Way et al. |
| 9,044,715 B2 | 6/2015 | Way et al. |
| 9,981,854 B2 | 5/2018 | Dahl |
| 11,130,680 B2 | 9/2021 | Han et al. |
| 11,479,524 B1 | 10/2022 | Panchal et al. |
| 2007/0289215 A1 | 12/2007 | Hemmings et al. |
| 2014/0120023 A1 | 5/2014 | Singh et al. |
| 2016/0083260 A1 | 3/2016 | Dahl |
| 2016/0251228 A1 | 9/2016 | Alkusayer |
| 2017/0327461 A1 | 11/2017 | Singh et al. |
| 2021/0395083 A1 | 12/2021 | Harale et al. |

FOREIGN PATENT DOCUMENTS

| | | |
|---|---|---|
| CN | 108554333 | 9/2018 |
| CN | 211056709 | 7/2020 |
| CN | 211497070 | 9/2020 |
| CN | 111957270 | 11/2020 |
| CN | 112064205 | 12/2020 |
| CN | 113184806 | 7/2021 |
| CN | 112957912 | 9/2022 |
| IN | 202121046065 | 12/2021 |
| JP | 2013095618 | 5/2013 |
| JP | 2016169138 | 9/2016 |
| KR | 20110037329 | 4/2011 |
| KR | 20210119823 | 10/2021 |
| WO | WO 2010036662 | 4/2010 |

OTHER PUBLICATIONS

Machine translation of JP 2016-169138 (Year: 2016).*
Guo et al., "Effect of single atomic layer graphene film on the thermal stability and hydrogen permeation of Pd-coated Nb composite membrane," International Journal of Hydrogen Energy, Feb. 2022, 47:8359-8371, 13 pages.
International Search Report & Written Opinion in International Appln. No. PCT/US2024/031255, dated Aug. 30, 2024, 15 pages.
Abashar, "Multi-stage membrane reactors for hydrogen production by ammonia decomposition," International Journal of Petrochemistry and Research, 2018, 2(1):109, 7 pages.
Abashar, "The impact of ammonia feed distribution on the performance of a fixed bed membrane reactor for ammonia decomposition to ultra-pure hydrogen," International Journal of Hydrogen Energy, 2019, 44(1):82, 9 pages.
Bartolomei et al., "Permeation of chemisorbed hydrogen through graphene: A flipping mechanism elucidated," Carbon, Feb. 2021, 178:718-727, 10 pages.
Cechetto et al. "H2 production via ammonia decomposition in a catalytic membrane reactor," Fuel Processing Technology, 2021, 216:106772, 9 pages.
Cerrillo et al., "High purity, self-sustained, pressurized hydrogen production from ammonia in a catalytic membrane reactor," Chemical Engineering Journal, 2022, 431, 134310, 12 pages.
Chuah et al., "Graphene-based Membranes for H2 Separation: Recent Progress and Future Perspective," Membranes, Nov. 2020, 30 pages.
Garcia-Garcia et al., "High purity hydrogen production by low temperature catalytic ammonia decomposition in a multifunctional membrane reactor," Catalysis Communications, 2008, 9(3), 482, 5 pages.
Lueking et al., "Atomic Hydrogen Diffusion on Doped and Chemically Modified Graphene," The Journal of Physical Chemistry, Feb. 2013, 117:6312-6319, 8 pages.
Pal et al., "A review on types, fabrication and support material of hydrogen separation membrane," Materials Today: Proceedings, May 2020, 28:1386-1391, 6 pages.
Pal et al., "Experimental investigation of natural polysaccharide-based mixed matrix membrane modified with graphene oxide and Pd-nanoparticles for enhanced gas separation performance," International Journal of Hydrogen Energy, Apr. 2022, 47:41820-41832, 13 pages.
Park et al., "A catalytic composite membrane reactor system for hydrogen production from ammonia using steam as a sweep gas," Journal of Membrane Science, 2020, 614, 118483, 42 pages.
Shah et al., "Compact ammonia reforming at low temperature using catalytic membrane reactors," Journal of Membrane Science, 2022, 644, 120147, 25 pages.
Silva et al., "Improved hydrogen permeation through thin Pd/Al2O3 composite membranes with graphene oxide as intermediate layer," International Journal of Hydrogen Energy, Jul. 2020, 45:22990-23005, 16 pages.
Zeynali et al., Performance evaluation of graphene oxide (GO) nanocomposite membrane for hydrogen separation: Effect of dip coating sol concentration, Separation and Purification of Technology, 2018, 200:169-176, 8 pages.
Zhang et al., "Efficient Ammonia Decomposition in a Catalytic Membrane Reactor to Enable Hydrogen Storage and Utilization," ACS Sustainable Chemistry & Engineering, 2019, 7(6):5975, 11 pages.

* cited by examiner

HYDROGEN SEPARATION

TECHNICAL FIELD

This disclosure relates to separation of hydrogen from gas.

BACKGROUND

Hydrogen is the lightest element. At standard conditions, hydrogen is a gas of diatomic molecules and is colorless, odorless, tasteless, non-toxic, and combustible. Hydrogen is the most abundant chemical substance in the universe. Most of the hydrogen on Earth exists in molecular forms, such as in water and in organic compounds (such as hydrocarbons). Some examples of uses of hydrogen include fossil fuel processing (for example, hydrocracking) and ammonia production. Hydrogen is also an energy carrier.

Synthesis gas, also referred to as syngas, is a fuel gas mixture that includes hydrogen, carbon monoxide, and sometimes carbon dioxide. Syngas is combustible and can be used as a fuel of internal combustion engines. In some cases, syngas can be used as an intermediate for producing synthetic petroleum for use as a fuel or lubricant. Syngas can also be used to produce methanol. As another example, hydrogen can be separated from syngas for use in various processes.

SUMMARY

This disclosure describes technologies relating to separation of hydrogen from gas. The subject matter described in this disclosure can be implemented in particular implementations, so as to realize one or more of the following advantages. The composite membranes described herein exhibit high permeability and high separation factors with respect to hydrogen and can be scaled up both in size (e.g., in length and surface area) and quantity to meet hydrogen separation demands on an industrial scale. The composite membranes described herein include an intermediate layer of graphene and/or graphene oxide sandwiched between catalytic metallic layers (for example, including palladium or a palladium-based alloy) that can reduce the amount of expensive metals (such as palladium) used to fabricate such membranes. By sandwiching a graphene or graphene oxide layer between the catalytic metallic layers, any impurities (e.g., non-hydrogen compounds) can be blocked from passing through the composite membrane, thereby improving purity of the hydrogen being separated from the remaining portion of the gas stream. The composite membranes described herein can include catalytic metallic layers that have thicknesses that are reduced in comparison to conventional membranes, which in turn increases the flux of hydrogen through the composite membranes and reduces costs of the composite membranes. In some cases, the catalytic metallic layers of the composite membranes can have a greater thickness to be able to achieve separation of high purity hydrogen, as well as increased thermal and chemical stability. The composite membranes described herein are configured to allow passage of hydrogen atoms and protons while blocking atoms and/or molecules that are larger than hydrogen atoms. Thus, the composite membranes described herein can also be implemented in applications in which proton separation is desired. For example, the composite membranes described herein can supplement or replace protonic membranes in different applications.

Certain aspects of the subject matter described can be implemented as an apparatus for separating hydrogen molecules from a gas stream. The apparatus includes a porous substrate and a multi-layer membrane. The porous substrate has a pore structure. The pore structure is configured to allow diffusion of hydrogen molecules through the porous substrate. The multi-layer membrane is disposed on a surface of the porous substrate. The multi-layer membrane is configured to, in response to contacting a hydrogen molecule present in the gas stream, split the hydrogen molecule into at least one of hydrogen atoms or protons. The multi-layer membrane is configured to allow passage of the hydrogen atoms or protons through the multi-layer membrane while blocking passage of compounds that may be present in the gas stream that are larger than hydrogen molecules. The hydrogen atoms or protons, after passing through the multi-layer membrane, combine to reform the hydrogen molecule. The multi-layer membrane includes a first metallic layer, a second metallic layer, and an intermediate layer. The first metallic layer includes palladium. The second metallic layer includes palladium. The intermediate layer is disposed between the first metallic layer and the second metallic layer. The intermediate layer includes at least one of graphene or graphene oxide.

This, and other aspects, can include one or more of the following features. The porous substrate can be metallic. The multi-layer membrane can be coupled to the surface of the porous substrate by an interlayer. The interlayer can include at least one of aluminum oxide, zirconium oxide, cerium oxide, or silicon oxide. The first metallic layer can be made of a first alloy. The first alloy can include palladium and at least one of gold, silver, yttrium, copper, platinum, or ruthenium. The second metallic layer can be made of a second alloy. The second alloy can include palladium and at least one of gold, silver, yttrium, copper, platinum, or ruthenium. Each of the first metallic layer and the second metallic layer can have thicknesses in a range of from about 1 micrometer ($\mu$m) to about 2 $\mu$m. The multi-layer membrane can have a thickness in a range of from about 3 micrometers ($\mu$m) to about 10 $\mu$m. The porous substrate and the multi-layer membrane can have the form of a tubular. The second metallic layer can be an outermost layer of the tubular. The porous substrate can be an innermost layer of the tubular.

Certain aspects of the subject matter described can be implemented as a method for producing a composite membrane for separating hydrogen molecules from a gas stream. A first metallic layer is disposed on a porous substrate. The porous substrate has a pore structure. The pore structure is configured to allow diffusion of hydrogen molecules through the porous substrate. The first metallic layer includes palladium. An intermediate layer is disposed on the first metallic layer. The intermediate layer includes at least one of graphene or graphene oxide. A second metallic layer is disposed on the intermediate layer. The second metallic layer includes palladium. The first metallic layer, the intermediate layer, the second metallic layer, and the porous substrate form the composite membrane. The composite membrane is treated with heat to equalize thickness and composition of the composite membrane.

This, and other aspects, can include one or more of the following features. The porous substrate can be metallic. An interlayer can be disposed on the porous substrate prior to disposing the first metallic layer. The interlayer can include at least one of aluminum oxide, zirconium oxide, cerium oxide, or silicon oxide. Disposing the first metallic layer on the porous substrate can include disposing the first metallic layer on the interlayer that has been disposed on the porous substrate. The first metallic layer can be made of a first alloy. The first alloy can include palladium and at least one of gold, silver, yttrium, copper, platinum, or ruthenium. The second metallic layer can be made of a second alloy. The second alloy can include palladium and at least one of gold, silver, yttrium, copper, platinum, or ruthenium. Each of the first metallic layer and the second metallic layer can have thicknesses in a range of from about 1 μm to about 2 μm. The multi-layer membrane can have a thickness in a range of from about 3 μm to about 10 μm. The porous substrate and the multi-layer membrane can have the form of a tubular. The second metallic layer can be an outermost layer of the tubular. The porous substrate can be an innermost layer of the tubular.

Certain aspects of the subject matter described can be implemented as a method. A gas stream is contacted with a surface of a composite membrane. The gas stream includes hydrogen molecules. The composite membrane includes a porous substrate and a multi-layer membrane. The multi-layer membrane includes a first metallic layer, an intermediate layer, and a second metallic layer. The first metallic layer includes palladium. The second metallic layer includes palladium. The intermediate layer includes at least one of graphene or graphene oxide. The composite membrane separates at least a portion of the hydrogen molecules from the gas stream. Separating at least the portion of the hydrogen molecules from the gas stream includes splitting, by the multi-layer membrane, at least the portion of the hydrogen molecules into at least one of hydrogen atoms or protons in response to contacting the gas stream. Separating at least the portion of the hydrogen molecules from the gas stream includes preventing, by the multi-layer membrane, passage of compounds that may be present in the gas stream that are larger than hydrogen molecules while allowing passage of the hydrogen atoms or protons through the multi-layer membrane.

This, and other aspects, can include one or more of the following features. The porous substrate can be metallic. The multi-layer membrane can be coupled to the surface of the porous substrate by an interlayer. The interlayer can include at least one of aluminum oxide, zirconium oxide, cerium oxide, or silicon oxide. The first metallic layer can be made of a first alloy. The first alloy can include palladium and at least one of gold, silver, yttrium, copper, platinum, or ruthenium. The second metallic layer can be made of a second alloy. The second alloy can include palladium and at least one of gold, silver, yttrium, copper, platinum, or ruthenium. Each of the first metallic layer and the second metallic layer can have thicknesses in a range of from about 1 μm to about 2 μm. The multi-layer membrane can have a thickness in a range of from about 3 μm to about 10 μm. The porous substrate and the multi-layer membrane can have the form of a tubular. The second metallic layer can be an outermost layer of the tubular. The porous substrate can be an innermost layer of the tubular. Contacting the gas stream with the surface of the composite membrane can include flowing the gas stream across an outer, circumferential surface of the second metallic layer. The hydrogen molecules that have separated from the gas stream can flow into and through an inner bore defined by the porous substrate.

The details of one or more implementations of the subject matter of this disclosure are set forth in the accompanying drawings and the description. Other features, aspects, and advantages of the subject matter will become apparent from the description, the drawings, and the claims.

DETAILED DESCRIPTION

This disclosure describes a composite membrane for hydrogen separation from a gas stream. The composite membrane includes a porous substrate, a first metallic layer, a graphene or graphene oxide layer, and a second metallic layer. The porous substrate can include metal or ceramic and is coated by an intermediate layer. The intermediate layer is configured to prevent interdiffusion between the substrate and the first metallic layer. The intermediate layer also reduces surface roughness and pore size of the porous substrate. The metallic layers are hydrogen-selective in that they selectively allow diffusion of hydrogen through the composite membrane while substantially blocking diffusion of other compounds that are present in a gas mixture. The addition of the graphene or graphene oxide layer further blocks leakage of impurities through potential defects in the outer (second) metallic layer. The addition of the graphene or graphene oxide layer can reduce the thickness of the metallic layers, which can result in higher permeability and reduced manufacturing costs. The metallic layers can be made of palladium or an alloy including palladium.

Figure 1A:
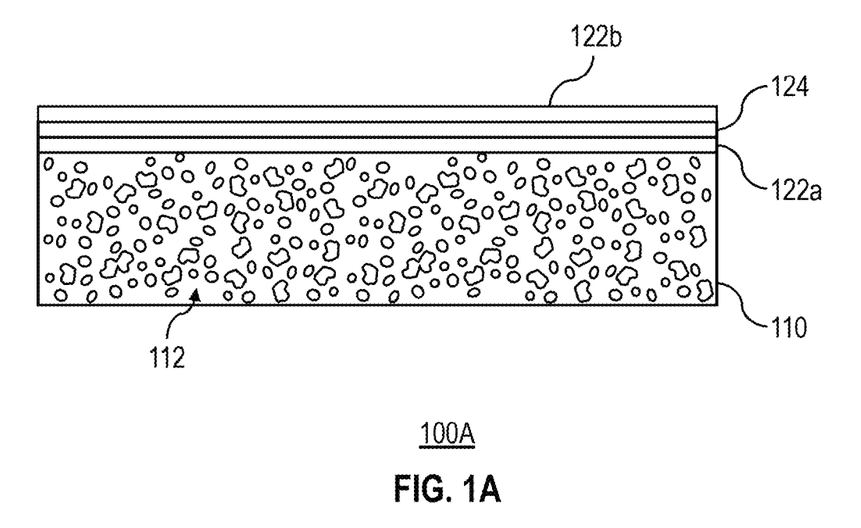
FIG. 1A is a schematic diagram of an example composite membrane for separating hydrogen from a gas stream.

FIG. 1A is a schematic diagram of an example composite membrane 100A that is for separating hydrogen from a gas stream. The composite membrane 100A includes a porous substrate 110 and a multi-layer membrane 120. The porous substrate 110 is configured to allow diffusion of hydrogen molecules through the porous substrate 110. The porous substrate 110 has a pore structure 112 that defines a plurality of pores that allow diffusion of the hydrogen molecules through the porous substrate 110. The multi-layer membrane 120 is disposed on a surface of the porous substrate 110. The multi-layer membrane 120 is configured to, in response to contacting a hydrogen molecule present in a gas stream, split the hydrogen molecule into hydrogen atoms, protons, or both. The multi-layer membrane 120 is configured to allow passage of the hydrogen atoms and/or protons (produced from splitting the hydrogen molecule) through the multi-layer membrane 120 while blocking passage of compounds that may be present in the gas stream that are larger than hydrogen molecules. For example, the gas stream can include syngas, and in such cases, the multi-layer membrane 120 is configured to allow passage of the hydrogen atoms and/or protons through the multi-layer membrane 120 while blocking passage of carbon monoxide, carbon dioxide, hydrogen sulfide, water, hydrocarbon(s), or any combinations of these. After passing through the multi-layer membrane 120, the hydrogen atoms and/or protons combine to reform the hydrogen molecule which can diffuse through the porous substrate 110. Thus, the composite membrane 100A separates hydrogen molecules from a remaining portion of the gas stream. Hydrogen molecules remain on the side of the porous substrate 110 of the composite membrane 100A, while the remaining portion of the gas stream remains on the opposite side of the multi-layer membrane 120. Because the multi-layer membrane 120 allows passage of hydrogen protons while blocking passage of atoms and/or molecules bigger than hydrogen atoms, the multi-layer membrane 120 can also be implemented in applications different from hydrogen separation. For example, the multi-layer membrane 120 can be implemented in any application where separation of protons is desirable. As one example, the multi-layer membrane 120 can be implemented to supplement or replace a protonic membrane (such as a proton ceramic membrane or proton-exchange membrane).

In some implementations, the porous substrate 110 is made of a ceramic material. The ceramic material making up the porous substrate 110 can include, for example, alpha-aluminum oxide ($\alpha$-$Al_2O_3$), titanium oxide ($TiO_2$), zirconium oxide ($ZrO_2$), or any combinations of these. The porous substrate 110 can, for example, be made of a ceramic material having an asymmetric structure with a range of pore sizes (such as from about 70 nanometers (nm) to about 1,000 nm) or a symmetric structure with a range of pore sizes (such as from about 100 nm to about 300 nm). In some implementations, the porous substrate 110 has a tubular (for example, cylindrical) shape, free of curvature along its longitudinal length. In some implementations, the pore structure 112 of the porous substrate 110 defines pores of a uniform size. For example, the pore structure 112 of the porous substrate 110 can have a uniform pore size distribution, free of defects. In some implementations, the pore structure 112 of the porous substrate 110 defines pores of varied sizes. The pores can be regularly shaped (for example, spherical) or irregularly shaped. In some implementations, the pore structure 112 defines passageways across multiple pores. In some implementations, the pore structure 112 of the porous substrate 110 defines pores having an average pore diameter in a range of from about 70 nm to about 300 nm (for example, about 200 nm). In some implementations, the porous substrate 110 has a thickness in a range of from about 0.6 millimeters (mm) to about 1 mm.

The multi-layer membrane 120 includes a first metallic layer 122a and a second metallic layer 122b. Both the first metallic layer 122a and the second metallic layer 122b include palladium. For example, the first metallic layer 122a can be made of pure palladium or an alloy that includes palladium. For example, the second metallic layer 122b can be made of pure palladium or an alloy that includes palladium. In some implementations, the first metallic layer 122a and the second metallic layer 122b have the same composition. In some implementations, the first metallic layer 122a and the second metallic layer 122b have different compositions. The multi-layer membrane 120 includes an intermediate layer 124 disposed between the first metallic layer 122a and the second metallic layer 122b. The intermediate layer 124 includes graphene, graphene oxide, or both. The metallic layers (122a, 122b) of the multi-layer membrane 120 catalytically split the hydrogen molecules into hydrogen atoms and/or protons. The intermediate layer 124 of the multi-layer membrane allows passage of the hydrogen atoms and/or protons (produced from splitting the hydrogen molecule) through the multi-layer membrane 120 while blocking passage of compounds that may be present in the gas stream that are larger than hydrogen molecules. The inclusion of the intermediate layer 124 in the multi-layer membrane 120 facilitates blockage of non-hydrogen compounds while also allowing for the individual metallic layers (122a, 122b) of the multi-layer membrane 120 to have smaller thicknesses in comparison to conventional membranes that include similar (and expensive) metallic components used to separate hydrogen from other gases. Further, the intermediate layer 124 can improve thermal resistance of the composite membrane, chemical resistance of the composite membrane, mechanical strength of the composite membrane, or any combination of these. In some implementations, the intermediate layer 124 has a thickness in a range of from about 0.3 nm to about 4 nm.

Figure 1B:
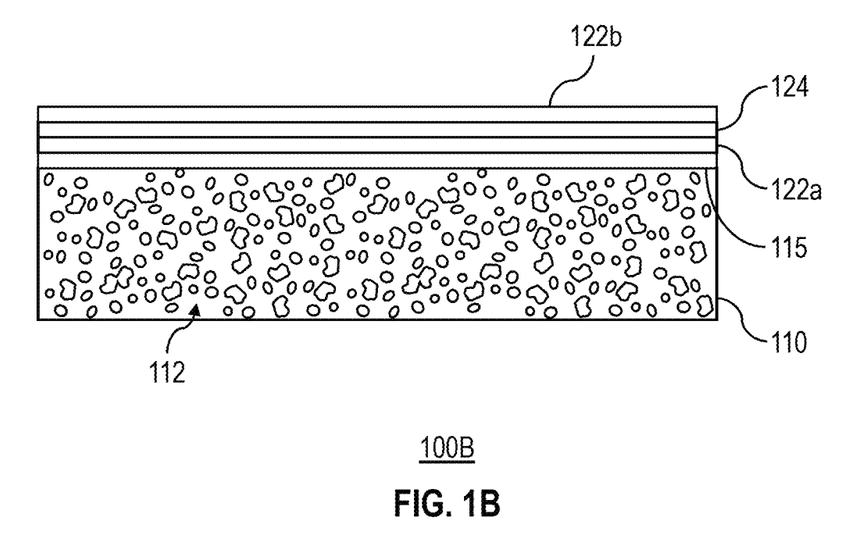
FIG. 1B is a schematic diagram of an example composite membrane for separating hydrogen from a gas stream.

In some implementations, the first metallic layer 122a is made of an alloy that includes palladium and at least one of gold, silver, yttrium, copper, platinum, or ruthenium. In some implementations, the second metallic layer 122b is made of an alloy that includes palladium and at least one of gold, silver, yttrium, copper, platinum, or ruthenium. In some implementations, the first metallic layer 122a is made of the same or similar alloy as the second metallic layer 122b. In some implementations, the first metallic layer 122a is made of an alloy that includes the same components as the alloy making up the second metallic layer 122b but with different concentration(s) of the components. In some implementations, the first metallic layer 122a has a thickness in a range of from about 1 µm to about 10 µm (for example, about 3 µm). In some implementations, the second metallic layer 122b has a thickness in a range of from about 1 µm to about 10 µm (for example, about 3 µm). In some implementations, the first metallic layer 122a and the second metallic layer 122b have the same thickness. In some implementations, the first metallic layer 122a and the second metallic layer 122b have different thicknesses. In some implementations, the multi-layer membrane 120 has a thickness in a range of from about 3 µm to about 10 µm (for example, from about 3 µm to about 4 µm). Increasing the thickness of the first metallic layer 122a, the thickness of the second metallic layer 122b, the thickness of the intermediate layer 124, or any combination of these can improve mechanical stability of the composite membrane 100B, which can in turn lengthen operating life of the composite membrane 100B.

FIG. 1B is a schematic diagram of an example composite membrane 100B for separating hydrogen from a gas stream. The composite membrane 100B can be substantially similar to the composite membrane 100A shown in FIG. 1A. For example, the composite membrane 100B can include the same or similar components as the composite membrane 100A. The composite membrane 100B includes the porous substrate 110 and the multi-layer membrane 120.

In some implementations, the porous substrate 110 is made of a metallic material. The porous substrate 110 can be made of, for example, stainless steel (such as Grade 304 or Grade 316 stainless steel), a nickel-chromium-iron-molybdenum alloy (such as Hastelloy X), or a nickel-chromium-based superalloy (such as Inconel). The metallic material making up the porous substrate 110 can, for example, have a media grade designation from 0.1 to 1. The porous substrate 110 can have a tubular shape. In some implementations, at least one of the ends of the tubular porous substrate is a closed end made of a dense metal through which protons and/or gas cannot permeate.

The composite membrane 100B can include an interlayer 115. The interlayer 115 can be disposed between the porous substrate 110 and the multi-layer membrane 120. The interlayer 115 can include at least one of aluminum oxide ($Al_2O_3$), zirconium oxide ($ZrO_2$), cerium oxide ($CeO_2$), or silicon oxide ($SiO_2$). The one or more aforementioned oxides can be incorporated into the interlayer 115, for example, by a dip-coating technique. The interlayer 115 can, for example, improve adhesion between the porous substrate 110 and the multi-layer membrane 120, improve structural stability of the composite membrane 100B, mitigate and/or eliminate leaching of metal(s) (such as palladium) from the multi-layer membrane 120 to the porous substrate 110, or any combinations of these. In some implementations, the interlayer 115 has a thickness in a range of from about 0.5 µm to about 2 µm. Although not shown in FIG. 1A, the composite membrane 100A can optionally include the interlayer 115, for example, between the porous substrate 110 and the multi-layer membrane 120 of the composite membrane 100A.

Figure 2A:
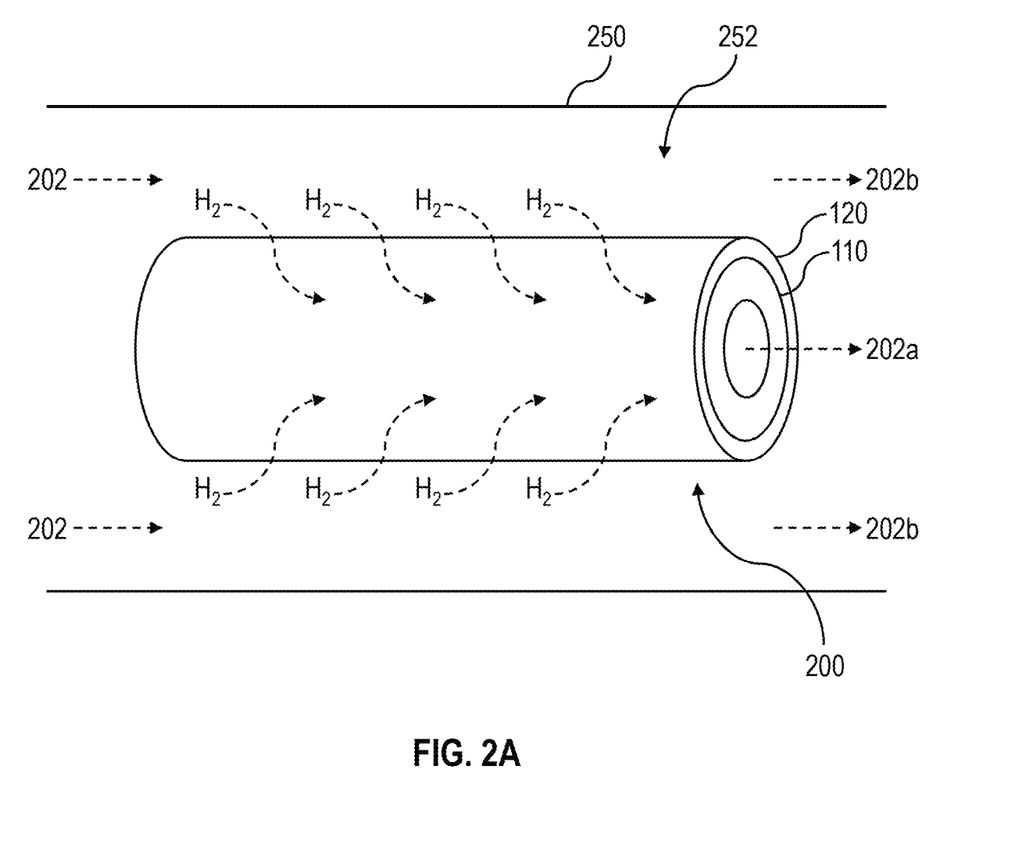
FIG. 2A is a schematic diagram of an example apparatus for separating hydrogen from a gas stream.

FIG. 2A is a schematic diagram of an example apparatus 200 for separating hydrogen from a gas stream 202. The apparatus 200 can be substantially similar to the composite membrane 100A shown in FIG. 1A or the composite membrane 100B shown in FIG. 1B. For example, the apparatus 200 can include the same or similar components as the composite membrane 100A or the composite membrane 100B. The apparatus 200 includes the porous substrate 110 and the multi-layer membrane 120. The apparatus 200 can, for example, be an implementation of the composite membrane 100A or the composite membrane 100B in a tubular form. In some implementations, the multi-layer membrane 120 is on the exterior of the apparatus 200 while the porous substrate 110 is interior of the multi-layer membrane 120. For example, the multi-layer membrane 120 can be an outer cylindrical portion of the apparatus 200, and the porous substrate 110 can be an inner cylindrical portion of the apparatus 200. In some implementations, the second metallic layer 122b is an outermost layer of the tubular apparatus 200, and the porous substrate 110 is an innermost layer of the tubular apparatus 200. In some implementations, an order of layers making up the tubular apparatus 200 in a direction from exterior to interior is the second metallic layer 122b, the intermediate layer 124, the first metallic layer 122a, and the porous substrate 110. In some implementations, the porous substrate 110 fills an inner bore of the multi-layer membrane 120. In some implementations, the porous substrate 110 itself defines an inner bore. Although not shown in FIG. 2A, in some implementations, the apparatus 200 includes the interlayer 115. In implementations in which the apparatus 200 includes the interlayer 115, the interlayer 115 can be an intermediate cylindrical portion of the apparatus 200 disposed between the porous substrate 110 and the multi-layer membrane 120. In such implementations, the order of layers making up the tubular apparatus 200 in the direction from exterior to interior can be the second metallic layer 122b, the intermediate layer 124, the first metallic layer 122a, the interlayer 115, and the porous substrate 110. In some implementations, the apparatus 200 has an outer diameter in a range of from about 0.3 centimeters (cm) to about 2.5 cm.

The gas stream 202 includes hydrogen molecules. The gas stream 202 can be any gas stream that includes hydrogen molecules. The gas stream 202 can, for example, include syngas, which includes hydrogen molecules. In some implementations, the gas stream 202 includes pressure swing adsorption off-gas, refinery off-gas, petrochemical off-gas, steel industry off-gas, an ammonia cracking outlet stream (which includes hydrogen and ammonia), or any combinations of these. The apparatus 200 can, for example, be disposed within a pipe 250 flowing the gas stream 202. In such cases, the gas stream 202 can flow in the annulus 252 defined between the pipe 250 and the apparatus 200. The gas stream 202 can flow across an exterior surface of the apparatus 200. For example, the gas stream 202 can flow laterally across the exterior surface of the multi-layer membrane 120. The hydrogen molecules 202a that diffuse through the porous substrate 110 can, for example, be separately flowed to a separate process for further processing or exported to a pipeline or end user. The remaining portion 202b of the gas stream 202 can continue flowing out of the annulus 252, for example, to a separate process for further processing (for example, further separation of other component(s)). An end of the apparatus 200 can be connected to another pipe (not shown). For example, the right-hand end of the apparatus 200 shown in FIG. 2A can be connected to a pipe (not shown) for flowing the hydrogen molecules 202a to a separate process for further processing or exported to a pipeline or end user. The left-hand end of the apparatus 200 shown in FIG. 2A can, for example, be a free-standing closed end. In some implementations, the apparatus 200 can be installed within a bed of a reactor along with a pelletized or structured catalyst configured to accelerate a rate of a chemical reaction (for example, a steam reforming reaction, a water-gas shift reaction, a dehydrogenation reaction, or an ammonia cracking reaction). In such implementations, gas stream 202 can include additional reactive species, such as propane, butane, a mixture of hydrocarbons having a carbon number ranging from 1 (such as methane) to 10 (such as decane), ammonia, or any combinations of these.

Figure 2B:
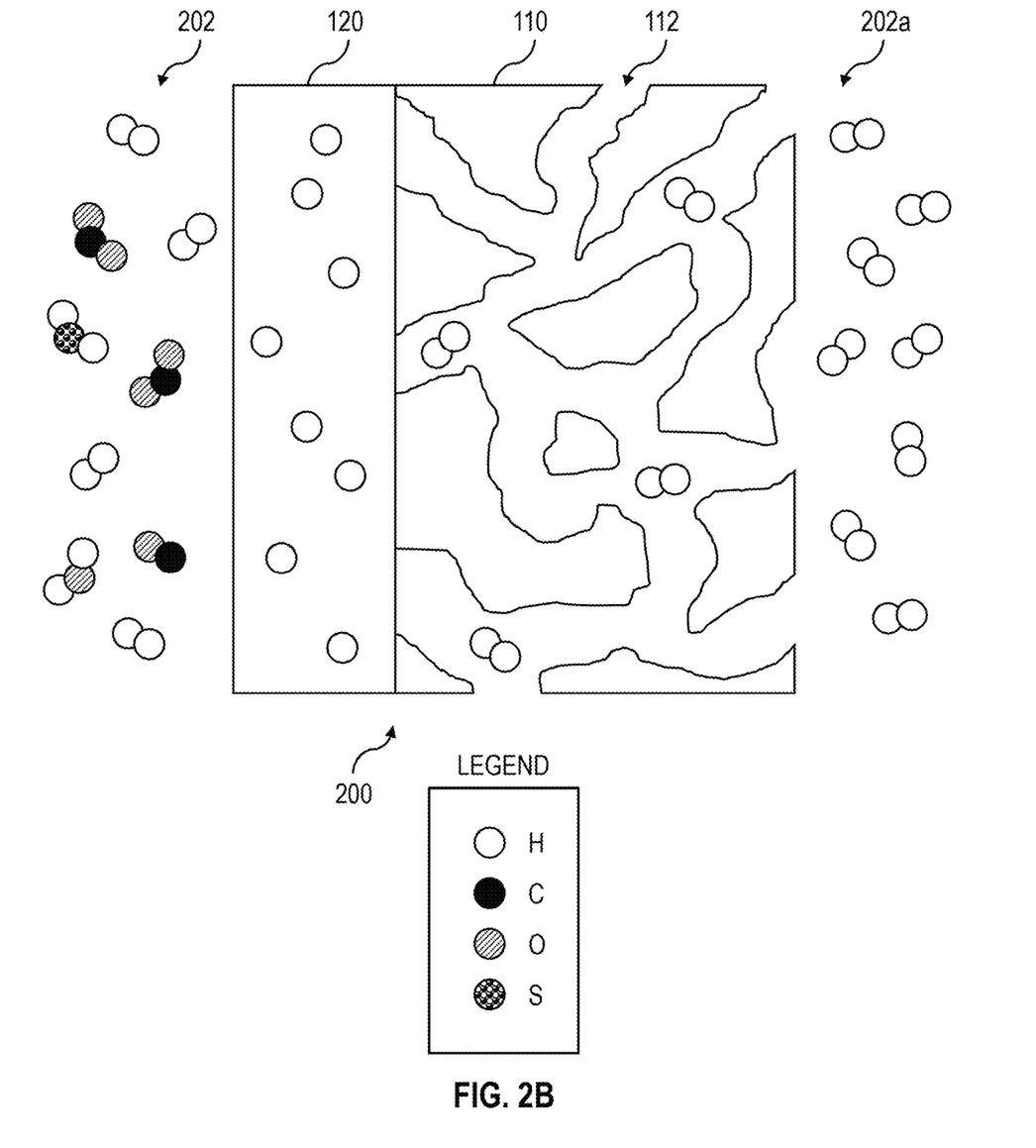
FIG. 2B is a zoomed schematic diagram of a cross-sectional portion of the apparatus of FIG. 2A.

FIG. 2B is a zoomed schematic diagram of a cross-sectional portion of the apparatus 200 of FIG. 2A. As the gas stream 202 flows across the exterior surface of the multi-layer membrane 120, the multi-layer membrane 120 catalytically splits the hydrogen molecules present in the gas stream 202 into hydrogen atoms and/or protons in response to contact with the gas stream 202. Because the multi-layer membrane 120 selectively allows hydrogen atoms and/or protons to pass through the multi-layer membrane 120 while blocking other compounds, the hydrogen atoms and/or protons diffuse into the inner bore defined by the multi-layer membrane 120. After passing through the multi-layer membrane 120, the hydrogen atoms and/or protons 202a combine to reform hydrogen molecules which then diffuse through the porous substrate 110. Thus, non-hydrogen compounds remain exterior to the apparatus 200 while hydrogen molecules flow through an interior of the apparatus 200.

Figure 3:
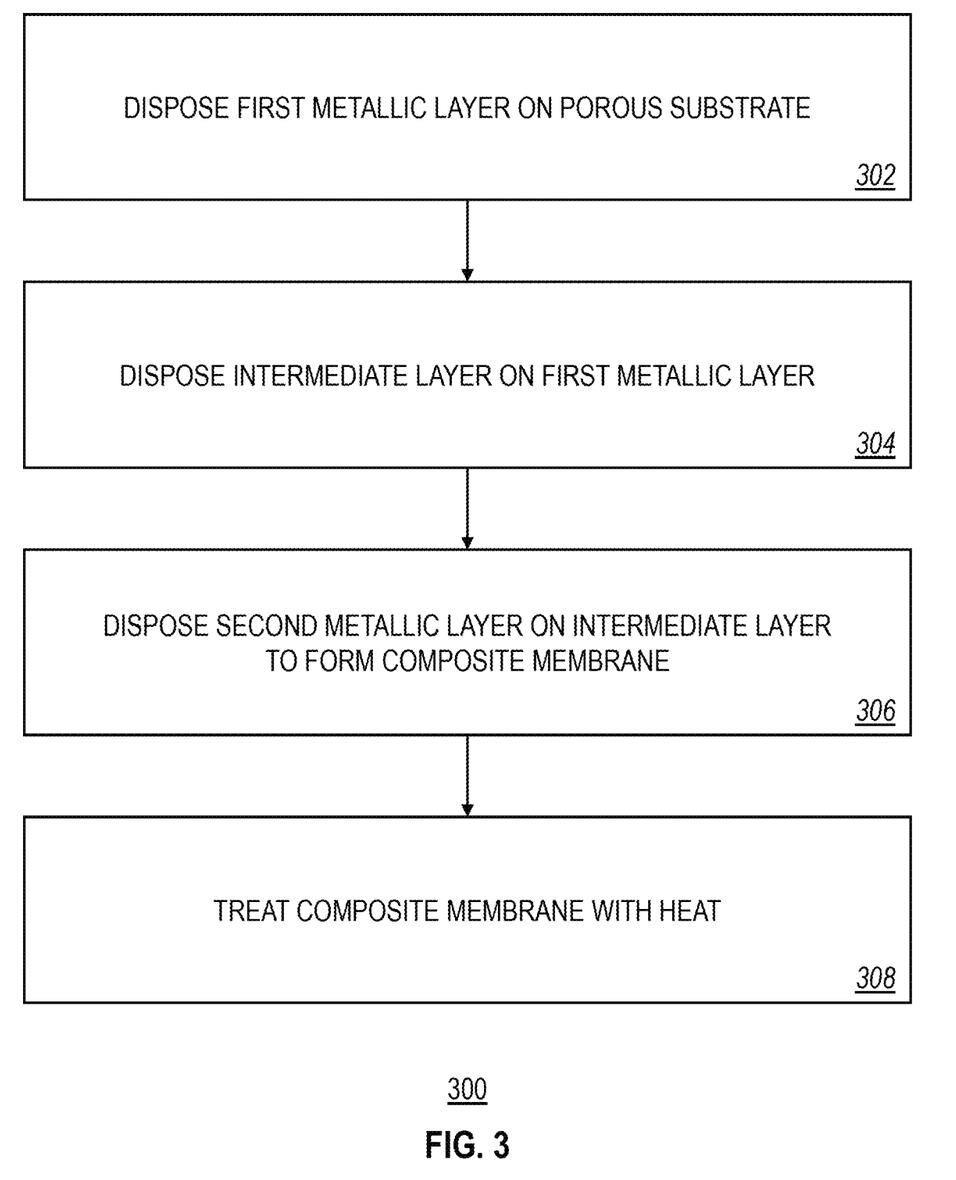
FIG. 3 is a flow chart of an example method for producing an apparatus for separating hydrogen from a gas stream.

FIG. 3 is a flow chart of an example method 300 for producing a composite membrane for hydrogen separation from a gas stream. The method 300 can, for example, be implemented to produce any of the composite membrane 100A, the composite membrane 100B, or the apparatus 200. At block 302, a first metallic layer (such as the first metallic layer 122a) is disposed on a porous substrate (such as the porous substrate 110). At block 304, an intermediate layer (such as the intermediate layer 124) is disposed on the first metallic layer 122a. At block 306, a second metallic layer (such as the second metallic layer 122b) is disposed on the intermediate layer 124. The first metallic layer 122a, the intermediate layer 124, the second metallic layer 122b, and the porous substrate 110 form the composite membrane. At block 308, the composite membrane is treated with heat to equalize thickness and composition of the composite membrane.

The heat treatment of the composite membrane at block 308 improves the thermal stability of the composite membrane. Heat treatment at hotter temperatures can further improve thermal stability of the composite membrane. As one example, the heat treatment at block 308 can minimize, stabilize, and/or eliminate leakage of undesired gases (such as nitrogen) through the composite membrane. As another example, the heat treatment at block 308 can stabilize (for example, homogenize) the rate of flux of hydrogen (for example, hydrogen atoms and/or protons) through the composite membrane. In addition to improving microstructure and reducing impurities in the composite membrane, the heat treatment (especially at hotter temperatures) at block 308 can drastically reduce, stabilize, and/or eliminate leakage of undesired gases (such as nitrogen) through the composite membrane. For example, the heat treatment at block 308 can include exposing the composite membrane to temperatures in a range of from about 650 degrees Celsius (° C.) to about 700° C. for a time period in a range of from about 2 hours to about 7 days. The heat treatment at block 308 can include annealing the composite membrane. In some implementations, the annealing time for the heat treatment at block 308 can be reduced by annealing the composite membrane at an increased pressure (for example, from about 12 bar to about 30 bar).

In some implementations, the porous substrate 110 is metallic, and the method 300 includes disposing an interlayer (such as the interlayer 115) on the porous substrate 110 prior to disposing the first metallic layer 122a. As described previously, the interlayer 115 can include alumina, zirconia, or both. In such implementations, disposing the first metallic layer 122a on the porous substrate 110 at block 302 includes disposing the first metallic layer 122a on the interlayer 115 that has been disposed on the porous substrate 110. For example, the first metallic layer 122a can be disposed on the interlayer 115 via a dip-coating technique at block 302.

In some implementations, disposing the first metallic layer 122a on the porous substrate 110 at block 302 includes disposing and/or growing a layer of the material (for example, pure palladium or a palladium-based alloy) making up the first metallic layer 122a on the porous substrate 110. For example, the first metallic layer 122a can be disposed on the porous substrate 110 at block 302 by physical vapor deposition (such as sputtering or electron beam evaporation), chemical vapor deposition, electroless plating, electroplating, or any combinations of these.

In some implementations, disposing the intermediate layer 124 on the first metallic layer 122a at block 304 includes disposing and/or growing a layer of the material (for example, graphene or graphene oxide) making up the intermediate layer 124 on the first metallic layer 122a. For example, the intermediate layer 124 can be disposed on the first metallic layer 122a at block 304 by Langmuir-Blodgett (LB) deposition, cationic surfactant-assisted LB deposition, micromechanical exfoliation, electrochemical exfoliation, epitaxial growth, chemical vapor deposition, the Brodie-Staudenmaier-Hofmann method (or a modified method thereof), the Hummers-Offeman method (or a modified method thereof), electrophoretic deposition, or any combinations of these. As another example, the intermediate layer 124 can be disposed on the first metallic layer 122a at block 304 by disposing a sheet of graphene or graphene oxide (that has already been fabricated) on the first metallic layer 122a.

For example, the sheet of graphene or graphene oxide can be grown on a different substrate, and then the sheet of graphene or graphene oxide can be transferred from the different substrate onto the first metallic layer 122a. A cold pressing technique or another suitable heat treatment technique can be applied to seal the edges of sheet of graphene or graphene oxide to the first metallic layer 122a. In cases in which the composite membrane has a tubular form (such as the apparatus 200), the sheet of graphene or graphene oxide can be wrapped around the first metallic layer 122a.

In some implementations, disposing the second metallic layer 122b on the intermediate layer 124 at block 306 includes disposing and/or growing a layer of the material (for example, pure palladium or a palladium-based alloy) making up the second metallic layer 122b on the intermediate layer 124. For example, the second metallic layer 122b can be disposed on the intermediate layer 124 at block 306 by physical vapor deposition (such as sputtering or electron beam evaporation), chemical vapor deposition, electroless plating, electroplating, or any combinations of these.

Figure 4:
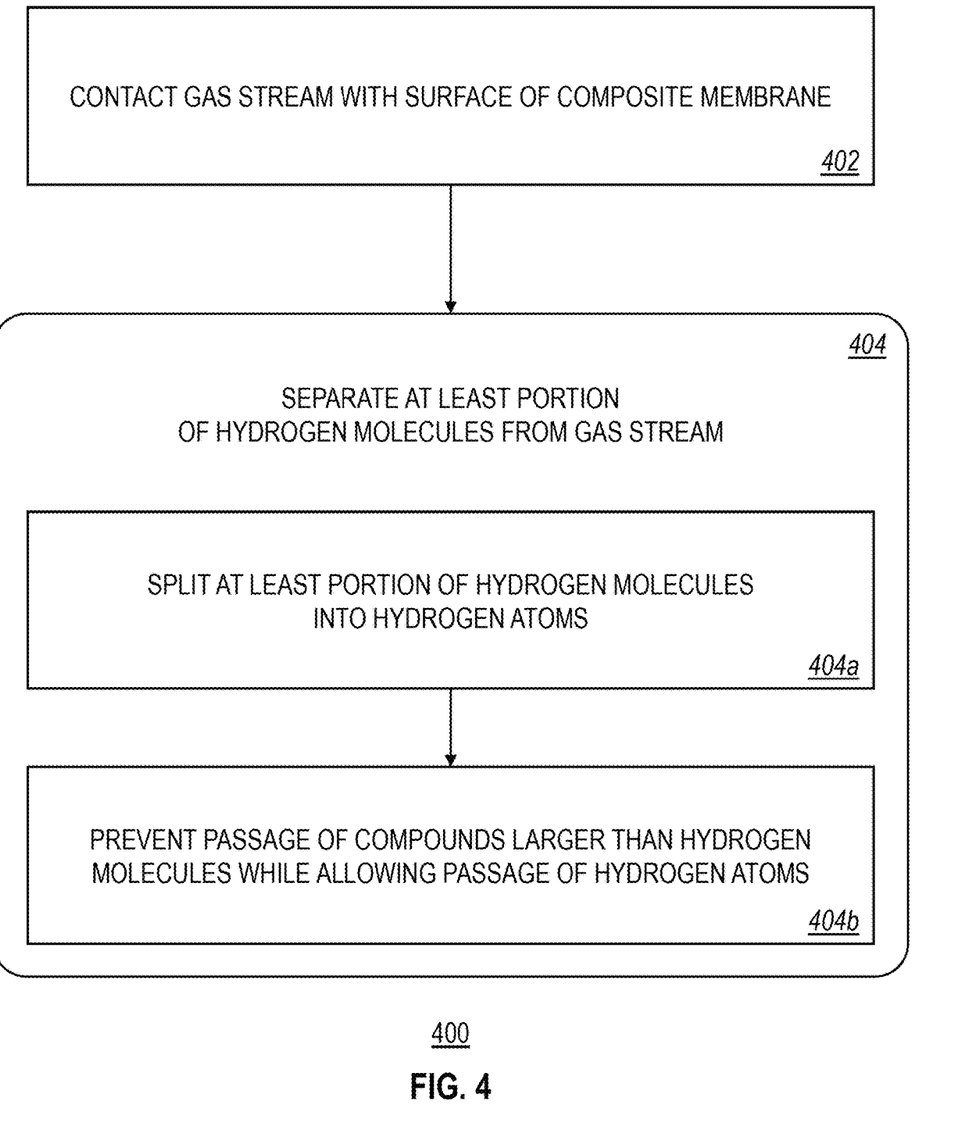
FIG. 4 is a flow chart of an example method for separating hydrogen from a gas stream.

FIG. 4 is a flow chart of an example method 400 for separating hydrogen from a gas stream. Any of the composite membrane 100A, the composite membrane 100B, or the apparatus 200 can, for example, implement the method 400. At block 402, a gas stream (such as the gas stream 202) is contacted with a surface of a composite membrane (such as the composite membrane 100A, the composite membrane 100B, or the apparatus 200). As described previously, the gas stream 202 includes hydrogen molecules, and the composite membrane includes a porous substrate (such as the porous substrate 110) and a multi-layer membrane (such as the multi-layer membrane 120). Contacting the gas stream 202 with a surface of the composite membrane (100A, 100B, or 200) at block 402 can include, for example, flowing the gas stream 202 across an exterior surface of the composite membrane (100A, 100B, or 200). For example, the gas stream 202 can be flowed across an outer, circumferential surface of the second metallic layer 122b of the multi-layer membrane 120. At block 404, the composite membrane (100A, 100B, or 200) separates at least a portion of the hydrogen molecules from the gas stream 202. Separating at least the portion of the hydrogen molecules from the gas stream 202 at block 404 includes blocks 404a and 404b. At block 404a, the multi-layer membrane 120 splits at least a portion of the hydrogen molecules into hydrogen atoms and/or protons in response to contacting the gas stream 202 at block 402. At block 404b, the multi-layer membrane 120 prevents passage of compounds that may be present in the gas stream 202 that are larger than hydrogen molecules while allowing passage of the hydrogen atoms and/or protons (that have been produced from splitting of the hydrogen molecule(s)) through the multi-layer membrane 120. After the hydrogen atoms and/or protons have passed through the multi-layer membrane 120, the hydrogen atoms and/or protons combine to reform hydrogen molecule(s), which then diffuse through the porous substrate 110. In some implementations, the hydrogen molecule(s) (such as the hydrogen molecules 202a) that have separated from the gas stream 202 flow into and through an inner bore defined by the porous substrate 110.

EXAMPLES

Figure 5A:
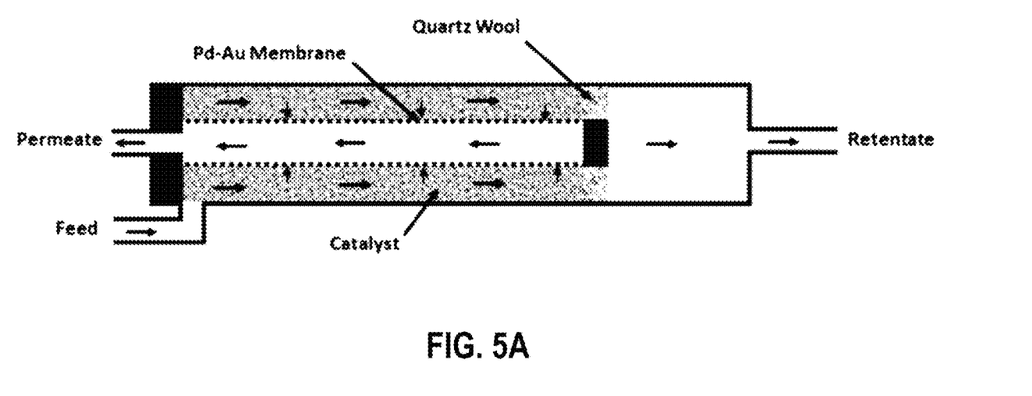
FIG. 5A is a schematic diagram of an example reactor including an example composite membrane for separating hydrogen from a gas stream.
Figure 5B:
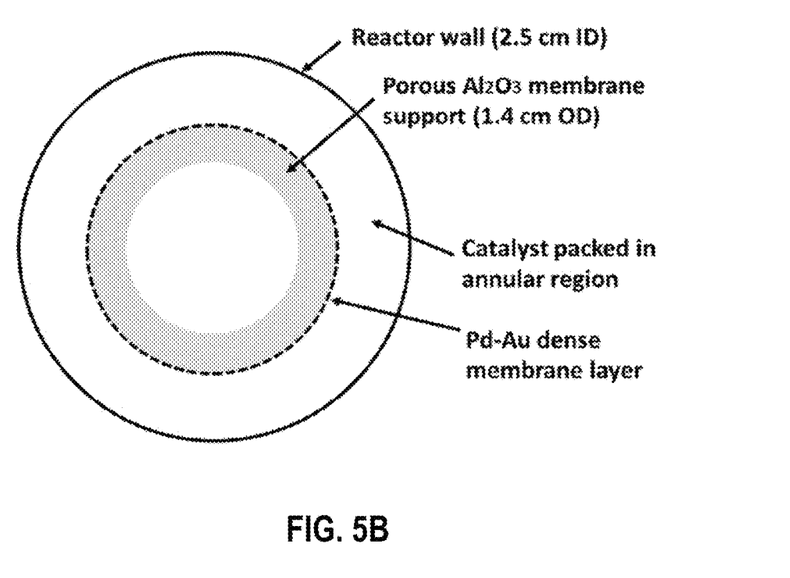
FIG. 5B is a schematic diagram of a cross-section of the reactor of FIG. 5A.

FIG. 5A is a schematic diagram of a bench-scale prototype, which included a reactor including a composite membrane for separating hydrogen from a gas stream. FIG. 5B shows a cross-section of the bench-scale prototype. The operating temperature for the experiments on the prototypes ranged from 550° C. to 600° C. The operating pressure for the experiments on the prototypes ranged from 9 bar to 30 bar. The feed gas stream fed to the prototypes included a mixture of compounds, such as methane, carbon monoxide, carbon dioxide, hydrogen, water (steam), or any combinations of these. Table 1 provides some example feed compositions for the gas streams that were tested. The feed gas stream contacted the catalyst bed and underwent a chemical reaction (such as a steam reforming reaction). Hydrogen that was formed (along with hydrogen already present in the feed gas stream) passed through the tubular membrane and into an inner bore of the tubular membrane. The permeate included the hydrogen that passed through the tubular membrane and exited the prototype. Compounds larger than hydrogen were prevented from passing through the tubular membrane and remained in the annular space defined between the tubular membrane and the reactor wall. The remaining compounds from the feed gas (including reaction products but excluding the hydrogen) passed through the quartz wool barrier and flowed out of the prototype as the retentate. The tubular membranes (excluding support) had thicknesses in a range of from 5 μm to 8 μm. The prototypes' metallic layers were made of an alloy including palladium and gold. The palladium-gold alloy had a gold content in a range of from 20% to 30% by weight.

TABLE 1

Experimental gas stream feed compositions

| | Simulated pre-reformed naphtha | Steam methane reforming |
|---|---|---|
| Methane | 34.6% | 95.3% |
| Hydrogen | 37.8% | — |
| Carbon dioxide | 22.8% | — |
| Carbon monoxide | 1.7% | — |
| Nitrogen | 3.4% | 4.7% |
| Selective catalytic reduction | 2.6 | 3.37 |
| Gas hourly space velocity | 676 h$^{-1}$ | 787 h$^{-1}$ |
| Weight hourly space velocity | 548 L-h$^{-1}$kg$^{-1}$ | 638 L-h$^{-1}$kg$^{-1}$ |

Figure 5C:
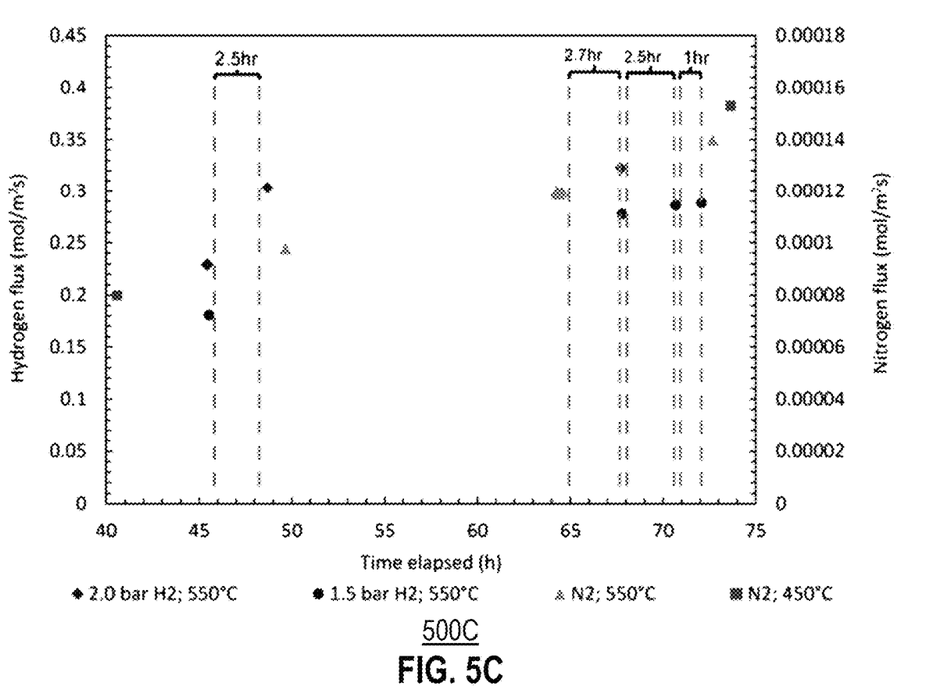
FIG. 5C is a plot showing flux of hydrogen and nitrogen through the example composite membrane versus time.
Figure 5D:
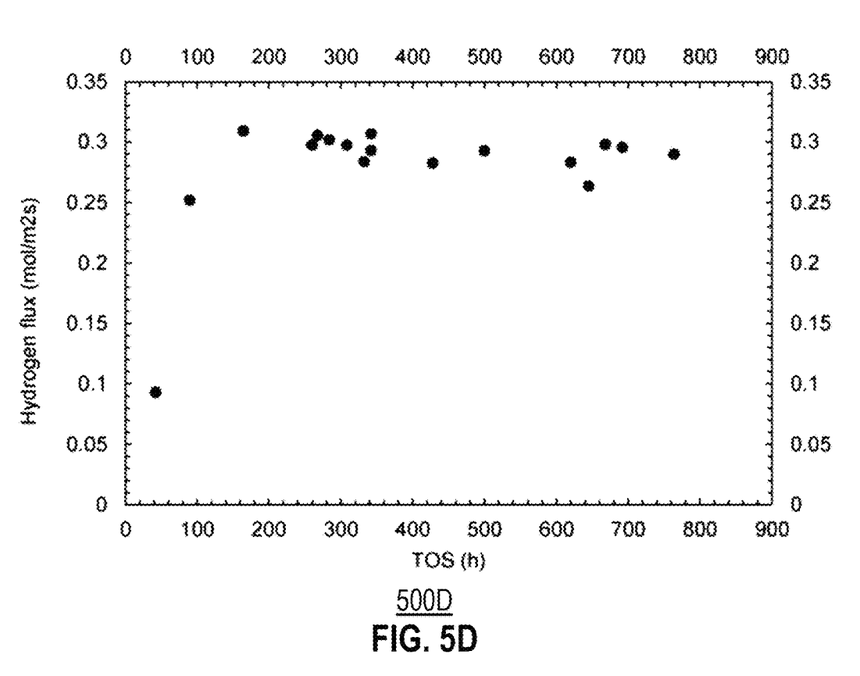
FIG. 5D is a plot showing flux of hydrogen through the example composite membrane versus time.

FIG. 5C is a plot 500C showing flux of hydrogen and nitrogen through the tubular membrane of the bench-scale prototype versus time. The time durations shown in plot 500C were the time durations for annealing the tubular membrane at a hydrogen pressure of 31 bar and an annealing temperature of 550° C. The flux of nitrogen was measured at 5 bar. FIG. 5D is a plot 500D showing flux of hydrogen through the tubular membrane of the bench-scale prototype versus time. The flux of hydrogen was measured periodically while maintaining an operating temperature of 450° C. and an operating pressure of 1.5 bar throughout the experiment.

The bench-scale prototype having a length of 5 cm and a surface area of 15 cm$^2$. The bench-scale prototype was designed for catalyst testing (5-50 cubic centimeter load) using liquid or gaseous hydrocarbon feeds for reaction with steam as an oxidant. The bench-scale prototype allowed for membrane performance evaluation in separation mode or with the membrane and catalyst packed in a single reactor. The bench-scale prototype was equipped with 6 mass flow controllers (one mass flow controller for hydrogen, carbon monoxide, carbon dioxide, methane, nitrogen, and air, each), which allowed the capability to evaluate the performance of the membrane across a wide range of feed compositions. The bench-scale prototype was equipped with three liquid feeds using high pressure pumps. The bench-scale prototype was designed for 50 bar and 1,050° C., which allowed for a wide range of operation conditions for testing various reforming reactions and process configurations. The bench-scale prototype included a gas-liquid separator and a chiller loop to separate the liquids prior to analysis of the gas using an online residual gas analysis gas chromatograph (RGA GC). The RGA GC was equipped with two thermal conductivity detectors (TCDs) and a flame ionization detector (FID). The bench-scale prototype was equipped with a programmable logic controller (PLC)-based control system that was automated with interlocks and safety measures against leakage of gas (such as hydrogen and carbon monoxide). Similar to the lab-scale prototype, the bench-scale prototype had a closed end. Unlike the lab-scale prototype, the bench-scale prototype had a flanged open end opposite the closed end. The bench-scale prototype was disposed within a pipe (not shown) flowing a gas stream that included hydrogen. The flanged open end of the bench-scale prototype was flanged to a separate outlet pipe (not shown) during experimentation for receiving the hydrogen that was separated from the gas stream flowing across the outer surface of the bench-scale prototype.

A pilot-scale prototype had a plurality of tubular membranes having lengths of 80-90 cm and surface areas of 361 cm$^2$. The pilot-scale prototype included 40 tubular membranes packed in a reactor with a 20 kilograms per day (kg/day) loading capacity. A steam reforming catalyst was loaded in the reactor along with the 40 tubular membranes. The gas stream fed to the reactor included natural gas and steam for the production of hydrogen. Similar to the lab-scale and bench-scale prototypes, the tubular membranes of the pilot-scale prototype each had a closed end and an open end opposite the closed end. The tubular membranes of the pilot-scale prototype were disposed within a pipe (not shown) flowing a gas stream that included hydrogen. The open ends of the tubular membranes of the pilot-scale prototype were coupled to separate outlet pipes (not shown) during experimentation for receiving the hydrogen that was separated from the gas stream flowing across the outer surfaces of the tubular membranes of the pilot-scale prototype. The separate outlet pipes (not shown) were connected to a pipe manifold for combining the hydrogen that was separated from the gas stream by the individual tubular membranes of the pilot-scale prototype. Hydrogen flux through the tubular membranes of the pilot-scale prototype was measured to be 7.2 normal cubic meters per hour per square meter (Nm$^3$/hr/m$^2$) at 550° C. and an initial hydrogen feed pressure of 8 bar.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:

1. An apparatus for separating hydrogen molecules from a gas stream, the apparatus comprising:
    a porous substrate having a pore structure configured to allow diffusion of hydrogen molecules through the porous substrate; and
    a multi-layer membrane disposed on a surface of the porous substrate, wherein the multi-layer membrane is configured to, in response to contacting a hydrogen molecule present in the gas stream, split the hydrogen molecule into at least one of hydrogen atoms or protons, wherein the multi-layer membrane is configured to allow passage of the hydrogen atoms or protons through the multi-layer membrane while blocking passage of compounds that may be present in the gas stream that are larger than hydrogen molecules, wherein the hydrogen atoms or protons, after passing through the multi-layer membrane, combine to reform the hydrogen molecule, wherein the multi-layer membrane comprises:
    a first metallic layer comprising palladium;
    a second metallic layer comprising palladium; and
    an intermediate layer disposed between the first metallic layer and the second metallic layer, wherein the intermediate layer comprises at least one of graphene or graphene oxide;
    wherein the porous substrate is metallic, and the multi-layer membrane is coupled to the surface of the porous substrate by an interlayer comprising at least one of aluminum oxide, zirconium oxide, cerium oxide, or silicon oxide.

2. The apparatus of claim 1, wherein the first metallic layer is made of a first alloy comprising palladium and at least one of gold, silver, yttrium, copper, platinum, or ruthenium, and the second metallic layer is made of a second alloy comprising palladium and at least one of gold, silver, yttrium, copper, platinum, or ruthenium.

3. The apparatus of claim 2, wherein each of the first metallic layer and the second metallic layer have thicknesses in a range of from about 1 micrometer ($\mu$m) to about 2 $\mu$m.

4. The apparatus of claim 2, wherein the multi-layer membrane has a thickness in a range of from about 3 micrometers ($\mu$m) to about 10 $\mu$m.

5. The apparatus of claim 2, wherein the porous substrate and the multi-layer membrane have the form of a tubular, the second metallic layer is an outermost layer of the tubular, and the porous substrate is an innermost layer of the tubular.

6. A method for producing a composite membrane for separating hydrogen molecules from a gas stream, the method comprising:
    disposing a first metallic layer on a porous substrate, wherein the porous substrate has a pore structure configured to allow diffusion of hydrogen molecules through the porous substrate, and the first metallic layer comprises palladium;
    disposing an intermediate layer on the first metallic layer, wherein the intermediate layer comprises at least one of graphene or graphene oxide;
    disposing a second metallic layer on the intermediate layer, wherein the first metallic layer, the intermediate layer, the second metallic layer, and the porous substrate form the composite membrane, and the second metallic layer comprises palladium; and
    treating the composite membrane with heat to equalize thickness and composition of the composite membrane;
    wherein the porous substrate is metallic, the method further comprises disposing an interlayer on the porous substrate prior to disposing the first metallic layer, the interlayer comprises at least one of aluminum oxide, zirconium oxide, cerium oxide, or silicon oxide, and disposing the first metallic layer on the porous substrate comprises disposing the first metallic layer on the interlayer that has been disposed on the porous substrate.

7. The method of claim 6, wherein the first metallic layer is made of a first alloy comprising palladium and at least one of gold, silver, yttrium, copper, platinum, or ruthenium, and the second metallic layer is made of a second alloy comprising palladium and at least one of gold, silver, yttrium, copper, platinum, or ruthenium.

8. The method of claim 7, wherein each of the first metallic layer and the second metallic layer have thicknesses in a range of from about 1 micrometer (μm) to about 2 μm.

9. The method of claim 7, wherein the multi-layer membrane has a thickness in a range of from about 3 micrometers (μm) to about 10 μm.

10. The method of claim 7, wherein the porous substrate and the multi-layer membrane have the form of a tubular, the second metallic layer is an outermost layer of the tubular, and the porous substrate is an innermost layer of the tubular.

11. A method comprising:
contacting a gas stream comprising hydrogen molecules with a surface of a composite membrane comprising a porous substrate and a multi-layer membrane, wherein the multi-layer membrane comprises a first metallic layer comprising palladium, an intermediate layer comprising at least one of graphene or graphene oxide, and a second metallic layer comprising palladium; and
separating, by the composite membrane, at least a portion of the hydrogen molecules from the gas stream, wherein separating at least the portion of the hydrogen molecules from the gas stream comprises:
splitting, by the multi-layer membrane, at least the portion of the hydrogen molecules into at least one of hydrogen atoms or protons in response to contacting the gas stream; and
preventing, by the multi-layer membrane, passage of compounds that may be present in the gas stream that are larger than hydrogen molecules while allowing passage of the hydrogen atoms or protons through the multi-layer membrane;
wherein the porous substrate is metallic, and the multi-layer membrane is coupled to the surface of the porous substrate by an interlayer comprising at least one of aluminum oxide, zirconium oxide, cerium oxide, or silicon oxide.

12. The method of claim 11, wherein the first metallic layer is made of a first alloy comprising palladium and at least one of gold, silver, yttrium, copper, platinum, or ruthenium, and the second metallic layer is made of a second alloy comprising palladium and at least one of gold, silver, yttrium, copper, platinum, or ruthenium.

13. The method of claim 12, wherein each of the first metallic layer and the second metallic layer have thicknesses in a range of from about 1 micrometer (μm) to about 2 μm.

14. The method of claim 12, wherein the multi-layer membrane has a thickness in a range of from about 3 micrometers (μm) to about 10 μm.

15. The method of claim 12, wherein the porous substrate and the multi-layer membrane have the form of a tubular, the second metallic layer is an outermost layer of the tubular, and the porous substrate is an innermost layer of the tubular.

16. The method of claim 15, wherein contacting the gas stream with the surface of the composite membrane comprising flowing the gas stream across an outer, circumferential surface of the second metallic layer.

17. The method of claim 16, wherein the hydrogen molecules that have separated from the gas stream flow into and through an inner bore defined by the porous substrate.

* * * * *